US010228856B2

(12) United States Patent
Krishnamurthy et al.

(10) Patent No.: US 10,228,856 B2
(45) Date of Patent: Mar. 12, 2019

(54) STORAGE SPACE MANAGEMENT IN A THIN PROVISIONED VIRTUAL ENVIRONMENT

(71) Applicant: HEWLETT PACKARD ENTERPRISE DEVELOPMENT LP, Houston, TX (US)

(72) Inventors: Vikram Krishnamurthy, Bangalore (IN); Vijay Ram Sevagapandian, Bangalore (IN); Abhijit Chaudhuri, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/407,719

(22) Filed: Jan. 17, 2017

(65) Prior Publication Data
US 2017/0220261 A1 Aug. 3, 2017

(30) Foreign Application Priority Data
Jan. 28, 2016 (IN) .............................. 201641003147

(51) Int. Cl.
G06F 3/06 (2006.01)
(52) U.S. Cl.
CPC ............ G06F 3/0608 (2013.01); G06F 3/067 (2013.01); G06F 3/0631 (2013.01); G06F 3/0665 (2013.01)
(58) Field of Classification Search
CPC .... G06F 3/0608; G06F 3/0631; G06F 3/0665; G06F 3/067; G06F 3/0689
See application file for complete search history.

(56) References Cited

U.S. PATENT DOCUMENTS 8,230,069 B2 7/2012 Korupolu
8,656,136 B2 2/2014 Yamamoto et al.
8,661,182 B2 2/2014 Behera et al.
(Continued)

OTHER PUBLICATIONS

Vanover, R., "Changes Coming to Thin Provisioning," (Web Page), Mar. 25, 2009, 4 pages, available at https://virtualizationreview.com/blogs/everyday-virtualization/2009/03/changes-coming-to-thin-provisioning.aspx.

Primary Examiner — Mano Padmanabhan
Assistant Examiner — Andrew J Cheong
(74) Attorney, Agent, or Firm — Hewlett Packard Enterprise Patent Department

(57) ABSTRACT

A storage space management system for a thin provisioned virtual environment may comprise an over-allocation computation engine to compute an over-allocation metric for a virtual datastore. The over-allocation metric may be computed based on virtual storage space allocated to corresponding virtual machines and actual physical storage allocated to the virtual datastore. Further, the over-allocation metric may indicate extent of over-allocation of the actual physical storage to the virtual datastore. An available space computation engine may determine an available space metric for the virtual machines based on available datastore space and available physical storage space. An analysis engine may obtain a time value indicating time left within which storage space available for the virtual machines would be utilized. Further, the analysis engine may provide the over-allocation metric, the available space metric, and the time value to a capacity planning unit for storage space management in the virtual environment.

13 Claims, 6 Drawing Sheets

(56) References Cited

U.S. PATENT DOCUMENTS

| | | | |
|---|---|---|---|
| 8,694,563 B1* | 4/2014 | Cameron | G06F 17/30138 |
| | | | 707/812 |
| 8,762,525 B2 | 6/2014 | Devarakonda et al. | |
| 2009/0055593 A1* | 2/2009 | Satoyama | G06F 3/0608 |
| | | | 711/134 |
| 2010/0077158 A1* | 3/2010 | Asano | G06F 3/0605 |
| | | | 711/154 |
| 2011/0022807 A1* | 1/2011 | Maeda | G06F 3/0619 |
| | | | 711/154 |
| 2011/0082950 A1 | 4/2011 | Mine et al. | |
| 2012/0030404 A1* | 2/2012 | Yamamoto | G06F 3/0605 |
| | | | 711/6 |
| 2012/0151174 A1* | 6/2012 | Matsunaga | G06F 3/0644 |
| | | | 711/171 |
| 2012/0303923 A1* | 11/2012 | Behera | G06F 9/5077 |
| | | | 711/170 |
| 2013/0173849 A1 | 7/2013 | Balakrishnan et al. | |
| 2013/0238780 A1* | 9/2013 | Devarakonda | G06F 9/5072 |
| | | | 709/224 |
| 2014/0059207 A1 | 2/2014 | Gulati et al. | |
| 2014/0229701 A1* | 8/2014 | Jaquet | G06F 12/0238 |
| | | | 711/171 |
| 2014/0250439 A1 | 9/2014 | Parashar et al. | |
| 2014/0281330 A1* | 9/2014 | Baldwin | G06F 12/023 |
| | | | 711/170 |

\* cited by examiner

STORAGE SPACE MANAGEMENT IN A THIN PROVISIONED VIRTUAL ENVIRONMENT

BACKGROUND

Storage area networks (SAN) provide storage which may be used for supporting a computing environment. A virtual environment may utilize a SAN for providing data storage for virtual machines implemented in the virtual environment. Virtual machines allow virtualization of an actual physical computing system and may communicate with the SAN for storage of data processed and generated during its operation. To optimize storage space utilization, thin provisioning may be used for allocation of storage space to the virtual machines on the basis of minimum space utilization by each virtual machine at a time.

BRIEF DESCRIPTION OF DRAWINGS

The detailed description is described with reference to the accompanying figures. It should be noted that the description and figures are merely example of the present subject matter and are not meant to represent the subject matter itself.

DETAILED DESCRIPTION

Figure 1:
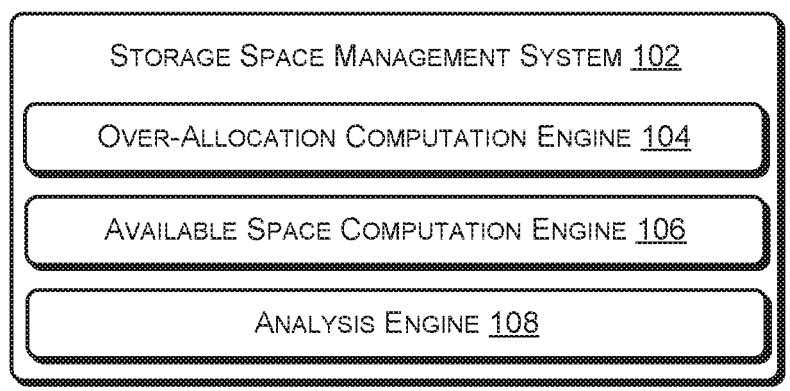
FIG. 1 illustrates a block diagram of a storage space management system, according to an example of the present subject matter.

A virtual environment may include multiple virtual datastores such that each virtual datastore is associated with, and manages, multiple virtual machines. The virtual datastore may be a virtual repository or logical container for storing virtual machine files, such as log files, scripts, configuration files, and virtual disks of the virtual machines associated with the virtual datastore. The virtual environment further utilizes a storage environment for providing data storage for the virtual datastore and the virtual machines associated with the virtual datastores. The storage environment includes a plurality of storage volumes grouped into different storage pools. The storage pools are logical sets of physical storage disks that may be used to provision the storage volumes for storing data of the virtual datastore. The storage volumes are a logical set of blocks provisioned from the storage pools. For instance, a storage pool of 100 Gigabytes (GB) physical storage space may be segregated into 5 storage volumes, logical blocks, of 20 GB each.

Further, the storage volumes within a particular storage pool are associated with different virtual datastores. Further, each virtual datastore may be associated with multiple storage pools to provide adequate amount of storage space to the virtual datastore and the associated virtual machines. For instance, a first virtual datastore may be associated with multiple storage volumes within a first storage pool and a second storage pool in the virtual environment. While a second virtual datastore may be associated with another set of storage volumes within the first storage pool and the second storage pool. Further, although a virtual datastore may be associated with multiple storage volumes, a storage volume may be associated with a single virtual datastore.

To optimize the storage space utilization, thin provisioning schemes may be used for allocating storage space to the virtual datastores. The thin provisioning scheme may involve allocating same storage space to multiple virtual datastores, such that each virtual datastore is allocated a minimum storage space. For instance, a storage pool having a storage space capacity of, say 40 GB may allocate the same storage space of 40 GB to 5 separate virtual datastores. Allocating the same storage space to multiple virtual datastores allows storage space optimization as the virtual datastores may use a small extent of the allocated storage space at a given time and thus the same storage pool may cater to multiple virtual datastores. Further, the virtual datastores may also implement additional thin provisioning schemes over the allocated storage space to share the allocated storage space among the associated virtual machines.

Having thin provisioning at the storage pool as well as the virtual datastore may, however, lead to over commitment of the storage space. For instance, a physical storage of 40 GB may end up being over committed or virtualized to, say, 400 GB. Having such an extent of over-allocation of the storage space may lead to storage space management issues. For instance, with the virtual machine being allocated more storage space than total physical storage space available, the virtual machine may run out of the physical storage space during operation even though some of the allocated storage space may still be available. Further, the placement of a virtual machine in the virtual environment includes a process of selecting virtual datastore having appropriate storage capacity. Thus, such an over allocation may result in incorrect placement of virtual machines with a virtual datastore having insufficient physical storage.

Example approaches for storage space management in a thin provisioned virtual environment having a plurality of virtual datastores associated with multiple virtual machines are described. As per an example of the present subject matter, a set metrics related to storage space utilization and allocation in a thin provisioned virtual environment are computed. The various metrics indicate extent of over-allocation of storage space to the virtual machines with respect to the actual physical storage, actual space available for data storage for the virtual machines, and time left within which space available for the virtual datastores would be utilized. The various metrics may additionally indicate a set of competing storage volumes consuming storage space at a higher rate than storage volumes associated with the virtual datastore under consideration. The various metrics may then be used for storage space management. For instance, the various metrics may be used for optimal placement of virtual machines in the virtual environment to effectively manage storage space allocation and utilization by the virtual machines.

In one example, an over-allocation metric is computed for the virtual datastores. The over-allocation metric indicates extent of over-allocation of actual physical storage to the virtual datastores. In one example, the over-allocation metric may be computed based on virtual storage space allocated to virtual machines associated with the virtual datastore and the actual physical storage allocated to the virtual datastore. In one example, the actual physical storage indicates actual size of storage volumes associated with the virtual datastore. In a thin provisioned virtual environment, the actual physical storage may differ from allocated physical storage allocated to the virtual datastore owing to thin provisioning at the storage volume. The virtual storage space indicates a total of storage spaces allocated to each virtual machine associated with the virtual datastore. In a thin provisioned virtual environment having thin provisioning performed twice, the virtual storage space may be greater than the actual physical storage and the allocated physical storage.

Further, an available space metric may be determined for the virtual machines associated with the virtual datastore, based on available datastore space and available physical storage space. In one example, the available space metric indicates space available for data storage for the virtual machines. The available datastore space may indicate unutilized storage space from the allocated physical storage of the virtual datastore. The available physical storage space indicates unutilized physical storage space available in storage pools associated with the virtual datastore. As the storage volumes are logical blocks within a storage pool, additional physical storage space of the storage pool may be utilized by the storage volumes associated with the virtual datastore and thus the available physical storage space is calculated for the entire storage pool and not the associated storage volumes.

Subsequently, a time value may be computed to indicate time left before the storage space available for data storage of the virtual machines is utilized. Storage space available for data storage of the virtual machines may be one of the available datastore space and the available physical storage space. The time value may thus indicate the time within which either the available datastore space or the available physical storage space is utilized. In one example, the time value is computed based on similar datastore time values and storage pool time values provided by a datastore time-to-threshold metric and a storage pool time-to-threshold metric, respectively.

Further, a set of competing storage volumes for the virtual datastore is identified based on input/output (I/O) activity of each storage volume. In one example, the competing storage volumes belong to the same storage pools as the storage volumes associated with the virtual datastore, but are not associated with the virtual datastore.

Subsequently, the over-allocation metric, the available space metric, the time value, and the set of competing storage volumes may be used for storage space management in the virtual environment. In one example, the matrices may be used to determine optimized placements of the plurality of virtual machines based on the metrics. Further, based on the set of metrics, additional storage volumes may be assigned to the virtual datastore or physical storage space of the current storage volumes may be updated.

The present subject matter thus may, for example, facilitate storage space management in a thin provisioned virtual environment. The various metrics may, for example, help in analyzing the effect of thin provisioning at two different stages in the virtual environment. The matrices may, for example, further help in analyzing stability of the thin provisioned virtual environment. Further, as the metrics may provide measures related to the storage capacity of the virtual datastores and storage pools and space utilization by the different virtual machines, the metrics may also be used for dynamic placements of new virtual machines. The metrics may further be used for replacement of existing virtual machines based on the rate of storage space consumption by the virtual machine, its associated datastore, and other virtual datastores associated with the same storage pools as the virtual datastore of the virtual machine under consideration.

The present subject matter is further described with reference to FIGS. 1 to 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates an example block diagram of a storage space management system 102 for storage space management in a thin provisioned virtual environment (not shown in the figure), according to an example of the present subject matter. The virtual environment may further include a plurality of virtual datastores (not shown in the figure) associated with multiple virtual machines (not shown in the figure). In one example, the storage space management system 102, hereinafter referred to as system 102, may be implemented as a virtual machine in the virtual environment. in another example, the system 102 may be implemented in, for example, desktop computers, multiprocessor systems, personal digital assistants (PDAs), laptops, network computers, cloud servers, minicomputers, mainframe computers, hand-held devices, such as tablets. The system 102 may also be hosting a plurality of applications.

The system 102 may include, for example, an over-allocation computation engine 104, an available space computation engine 106, and an analysis engine 108. In operation, the over-allocation computation engine 104 may compute an over-allocation metric a virtual datastore based on virtual storage space allocated to corresponding virtual machines and actual physical storage allocated to the virtual datastore. In one example, the over-allocation metric indicates extent of over-allocation of the actual physical storage to the virtual datastore.

The available space computation engine 106 may determine an available space metric for the virtual machines associated with the virtual datastore. In one example, the available space computation engine 106 may determine the available space metric based on available datastore space and available physical storage space. The available space metric may indicate maximum space available for data storage for the virtual machines. Further, the analysis engine 108 may obtain a time value indicating time left within which space available for the virtual machine would be utilized. The analysis engine 108 may subsequently provide at least the over-allocation metric, the available space metric, and the time value to a capacity planning unit for storage space management in the virtual environment.

Figure 2:
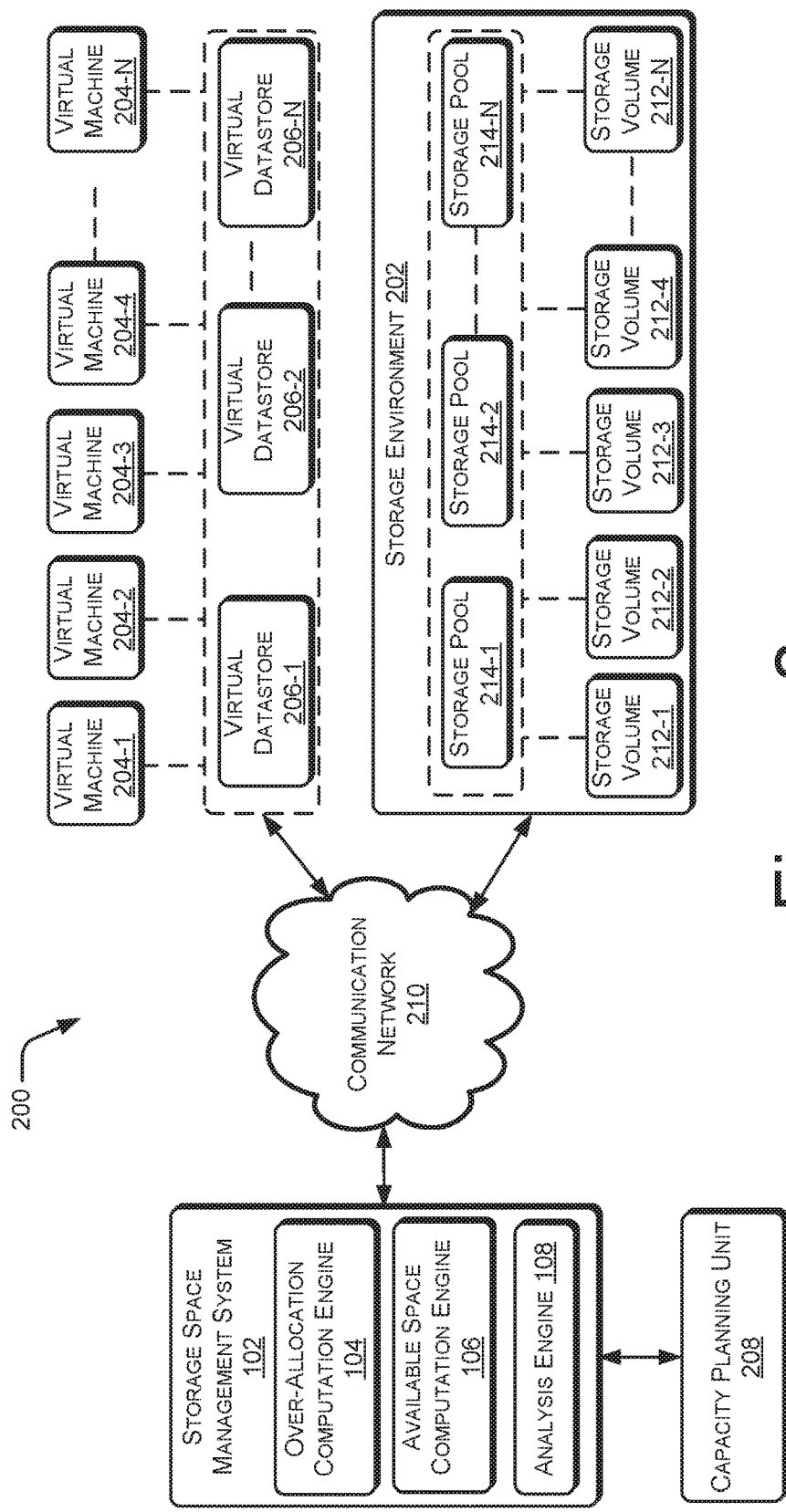
FIG. 2 illustrates a virtual environment implementing a storage space management system, according to an example of the present subject matter.

FIG. 2 illustrates an example virtual environment 200 having multiple computing entities and a storage environment 202. The computing entities include the storage space management system 102 (referred to as the system 102), virtual machines 204-1, 204-2, 204-3, 204-4, . . . , 204-*n*, virtual datastores 206-1, 206-2, . . . , 206-*n*, and a capacity planning unit 208. In the present example, the capacity planning unit 208 is also implemented as a virtual machine in the virtual environment 200. In other examples, the capacity planning unit 208 may be implemented in, for example, desktop computers, multiprocessor systems, personal digital assistants (PDAs), laptops, network computers, cloud servers, minicomputers, mainframe computers, hand-held devices, such as tablets. The present description is provided considering that the system 102 and the capacity planning unit 208 are independent entities. However, other possible example implementations, implementing the system 102 and the capacity planning unit 208 on the same system, may also be used without deviating from the scope of the present subject matter The system 102 may communicate over a communication network 210, with the storage environment 202, the virtual machines 204, and the virtual datastores 206. The communication network 210 may include, for example, a local area network (LAN), a wireless local area network (WLAN), a virtual private network (VPN), the Internet, or the like, or a combination thereof. In some examples, a computer network may include a telephone network (for example, a cellular telephone network).

The virtual machines 204-1, 204-2, . . . , 204-n, are hereinafter collectively referred to as virtual machines 204, and individually as virtual machine 204 may be implemented as independent computing systems for performing various functions. The virtual datastores 206-1, 206-2, . . . , 206-N, are hereinafter collectively referred to as virtual datastore 206, and individually as virtual datastore 206. The virtual datastore 206 may be a repository for storing virtual machine files, such as log files, scripts, configuration files, and virtual disks of the virtual machines 204 associated with the virtual datastore 206. Further, each of the virtual datastores 206 may be associated with multiple virtual machines 204 as indicated in the FIG. 2.

The storage environment 202 includes a plurality of storage volumes 212-1, 212-2, 212-3, 212-4, . . . , 212-N, hereinafter collectively referred to as storage volumes 212, and individually as storage volume 212. The storage volumes 212 are physical storage devices used by the virtual datastores 206 to store data of the virtual machines 204, which is associated with the virtual datastore 206. The storage volumes 212 are grouped into different storage pools 214-1, 214-2, . . . , 214-N, hereinafter collectively referred to as storage pools 214, and individually as storage pool 214. The storage pools 214 may be further grouped into multiple storage arrays (not shown in the figure).

The storage pools 214 are logical sets of physical storage disks that may be used to provision the storage volumes 212 for storing data of the virtual datastore 206. The storage volumes 212 are a logical set of blocks provisioned from the storage pools 214. For instance, the storage volumes 212-1, and 212-2 may be provisioned from the storage pool 214-1. The storage volumes 212-3, and 212-4 may be provisioned from the storage pool 214-2. Thus, if the storage pools 214-1 and 214-2 have a physical disk space of 100 Gigabytes (GB), each of the storage volumes 212-1, 212-2, 212-3, and 212-4 may have a physical storage space of 50 GB.

Further, each storage pool 214 is associated with multiple virtual datastores 206 such that different storage volumes 212 within a particular storage pool 214 are associated with different virtual datastores 206. Further, each of the virtual datastores 206 may be associated with multiple storage pools 214 depending upon storage space utilization of the virtual datastore 206 and the associated virtual machines 204. Although a virtual datastore 206 may be associated with multiple storage volumes 212, a storage volume 212 may be associated with a single virtual datastore 206. In one example, the virtual environment 200 is a thin provisioned environment such that each of the storage volumes 212 may be independently thin provisioned or thick provisioned. Further, the virtual datastores 206 may also be thin provisioned or thick provisioned. Thus, in scenarios where both the virtual datastore 206 and the associated storage volumes 212 are thin provisioned, over-allocation of storage space may occur twice. For instance, in the previous example, if the virtual datastore 206-1 is associated with the storage volumes 212-1 and 212-3 of the storage pools 214-1 and 214-2, respectively, the virtual datastore 206-1 may be allocated a physical storage space of 200 GB and not the actual physical storage of 100 GB (sum of physical storage space of the storage volumes 212-1 and 212-3).

The allocated physical storage of 200 GB may be further thin provisioned by the virtual datastore 206-1 while allocating storage size to the virtual machines 204-1 and 204-2 associated with the virtual datastore 206-1. For instance, the virtual datastore 206-1 may allocate the storage size of 150 GB to each of the virtual machines 204-1 and 204-2. The virtual storage space allocated to the virtual machines 204-1 and 204-2 may thus be equal to 300 GB against the actual physical storage of 100 GB for the virtual datastore 206.

For storage space management within the virtual environment 200, the system 102 may compute the various metrics for each of the virtual datastores 206, the virtual machines 204, and the storage pools 214. The metrics once computed may be provided to the capacity planning unit 208 for managing storage space utilization and allocation. These aspects are further described in details in conjunction with FIG. 3.

Figure 3:
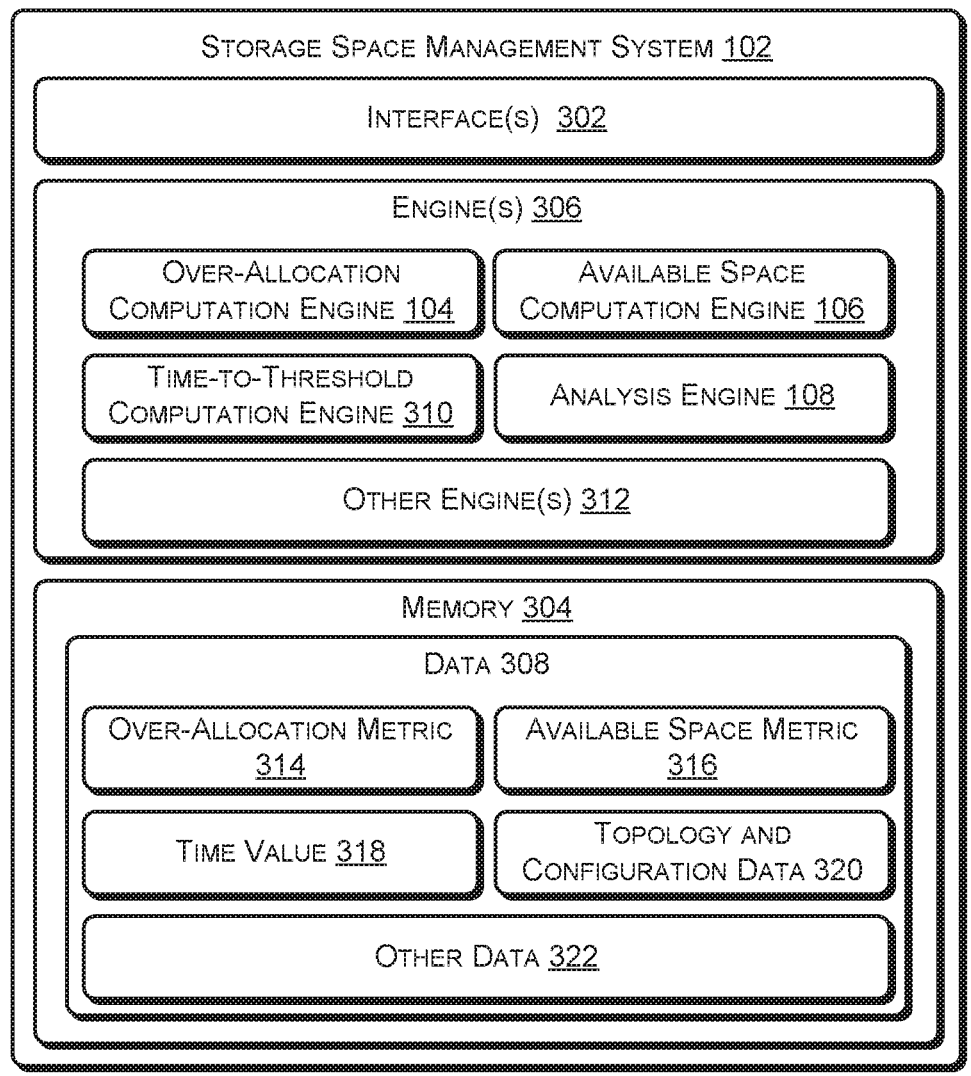
FIG. 3 illustrates various components of a storage space management system, according to an example of the present subject matter.

FIG. 3 illustrates various components of the storage space management system 102, according to an example of the present subject matter. In one example, the system 102 includes interface(s) 302, memory 304, and engine(s) 306. The interface(s) 302 may include a variety of interfaces, for example, interfaces for data input and output devices, referred to as I/O devices, storage devices, network devices, and the like. The interface(s) 302 facilitate communication between the system 102 and various computing devices connected in a networked environment. In one example, the interface(s) 302 may provide an interface for communication between the system 102 and the communication network 210.

The memory 304 may store computer-readable instructions, which may be fetched and executed, result in generating an alert to enable a user to retrieve a printed document. The memory 304 may include any non-transitory computer-readable medium including, for example, volatile memory such as RAM, or non-volatile memory such as EPROM, flash memory, and the like. The memory 304 further includes and data 308.

The engine(s) 306 may be implemented as a combination of hardware and programming (for example, programmable instructions) to implement functionalities of the engine(s) 306. In examples described herein, such combinations of hardware and programming may be implemented in a number of different ways. For example, the programming for the engine(s) 306 may be processor executable instructions stored on a non-transitory machine-readable storage medium and the hardware for the engine(s) 306 may include a processing resource (for example, processors), to execute such instructions. In the present examples, the machine-readable storage medium may store instructions that, when executed by the processing resource, implement engine(s) 306. In such examples, the system 102 may include the machine-readable storage medium storing the instructions and the processing resource to execute the instructions, or the machine-readable storage medium may be separate but accessible to system 102 and the processing resource. In other examples, engine(s) 306 may be implemented by electronic circuitry.

In an example, the engine(s) 306 include the over-allocation calculation engine 104, the available space computation engine 106, a time-to-threshold engine 310, the analysis engine 108, and other engine(s) 312. The other engine(s) 312 may implement functionalities that supplement applications or functions performed by the system 102.

The data 308 includes data that is either predefined or generated as a result of the functionalities implemented by any of the engine(s) 306. Further, the data 308 may include over-allocation data 314, available space metric 316, time value 318, topology and configuration data 320, and other data 322.

As previously described, the present subject matter relates to storage space management in a thin provisioned virtual environment, such as the virtual environment 200. The system 102 may initially obtain topology data and configuration data of the virtual datastores 206 and the storage pools 214 within the virtual environment 200. In one example, the topology data and configuration data is obtained by the analysis engine 108. The topology data for a virtual datastore 206 may indicate information, such as provisioning scheme of the virtual datastore 206, list of the storage pools 214 associated with the virtual datastore 206, list of the storage volumes 212 within each storage pool 214 associated with the virtual datastore 206, and a list of the virtual machines 204 associated with the virtual datastore 206. The configuration data, say, first configuration data, for the virtual datastore 206 may indicate storage space allocated to the virtual machines 204 associated with the virtual datastore 206 and available datastore space, i.e., unutilized storage space of the virtual datastore 206. Further, the topology data for a storage pool indicates information, such as list of the storage volumes 212 within the storage pool 214, provisioning scheme of the storage volumes 212, and list of the virtual datastores 206 associated with the storage pool 214 and its storage volumes 212. The configuration data, say, second configuration data of the storage pools 214 indicates physical storage space of each storage volume 212, total physical storage volume allocated to the storage pool 214, and available physical storage space. In one example, the analysis engine 108 may save the topology data and the configuration data of the virtual datastores 206 and the storage pools 214 in the topology and configuration data 320 (referred to as data 320 for sake of brevity).

Upon obtaining the data 320, the various metrics for storage space management are computed by the system 102. In one example, the over-allocation engine 104 may compute the over-allocation metric. As previously described, the over-allocation metric indicates extent of over-allocation of the actual physical storage to the virtual datastore 206 associated with the virtual machines 204.

The over-allocation engine 104 initially determines a datastore provisioning scheme for each of the virtual datastores 206 and volume provisioning scheme for each of the identified storage volumes 212. The datastore provisioning scheme for each of the virtual datastores 206 indicates whether the virtual datastore 206 is thin provisioned or thick provisioned. As described above, the datastore provisioning scheme may be obtained from the topology data. The over-allocation engine 104 may then identify the storage volumes 212 associated with the virtual datastore 206 under consideration, based on the topology data. For the storage volumes 212, the over-allocation engine 104 may further determine a volume provisioning scheme to determine whether the identified storage volumes 212 are thin provisioned or thick provisioned. As described above, the volume provisioning scheme may be obtained from the topology data.

In case the over-allocation engine 104 determines both, the virtual datastore 206 and the storage volumes 212, to be thick provisioned, the over-allocation engine 104 may compute the over-allocation metric to be equal to zero indicating that there has been no over-allocation of storage space. On the other hand, if either the virtual datastore 206 or the storage volume 212 is thin provisioned, the over-allocation engine 104 may calculate the over-allocation metric based on the virtual storage spaces allocated to the virtual machines 204 and the actual physical storage available for the virtual datastore 206.

In one example, the over-allocation engine 104 may calculate the virtual storage spaces allocated to the virtual machines 204 based on the datastore provisioning scheme and storage size of each of the virtual machines 204 associated with the virtual datastore 206 under consideration. The virtual storage spaces allocated to the virtual machines 204 may be calculated as sum of the storage size of each of the virtual machines 204 associated with the virtual datastore 206.

The over-allocation engine 104 may further calculate the actual physical storage available for the virtual datastore 206 associated with the virtual machines 204. In one example, the over-allocation engine 104 may calculate the actual physical storage based on the volume provisioning scheme and physical storage space of each of the identified storage volumes 212. If the identified storage volumes 212 associated with the virtual datastore 206 under consideration is thick provisioned, the over-allocation engine 104 may calculate the actual physical storage as equal to the size of the virtual datastore 206. If the identified storage volumes 212 are thin provisioned, the over-allocation engine 104 may sum up the physical storage space of each of the identified storage volumes 212 to compute the actual physical storage allocated to the virtual datastore 206. In another example, if the virtual datastore 206 resides on a local storage volume (not shown in the figure) residing on an ESX server (not shown in the figure) implementing the virtual datastore 206, the actual physical storage allocated to the virtual datastore 206 will be equal to the size of the virtual datastore 206.

The over-allocation engine 104 may subsequently determine the over-allocation metric as equal to a ratio of the virtual storage space allocated to virtual machines 204 and the actual physical storage allocated to the virtual datastore 206. For instance, in the example provided in FIG. 2, the over-allocation metric for the virtual datastore 206-1 may be computed as ratio of the virtual storage space (300 GB) allocated to virtual machines 204-1, 204-2 and the actual physical storage (100 GB) allocated to the virtual datastore 206. The over-allocation metric for the virtual datastore 206-1 may thus be equal to 3 as per the example used in the FIG. 2.

Once generated, the metric may be stored as the over-allocation metric 314 for further use by the analysis engine 108 and the capacity planning unit 208. Further, available space metric is computed by the available space computation engine 106. As previously described, the available space computation engine 106 may compute the available space metric for each of the virtual machines 204 based on the available datastore space and the available physical storage space. In one example, the available datastore space for a virtual datastore may indicate the free or unutilized storage space available with the virtual datastore. The available physical storage space may indicate the total free or unutilized physical storage space that is actually available in the storage pools 214 associated with the virtual datastore 206.

In one example, the available space computation engine 106 may determine the available datastore space based on the configuration data collected for the virtual datastore. As previously described, the configuration data for the virtual datastore 206 may indicate the available datastore space, i.e., the unutilized storage space of the virtual datastore 206. Further, the available space computation engine 106 may determine the available physical storage space based on the storage space available in each storage pool 214 associated with the virtual datastore 206. In one example, the available space computation engine 106 may determine the storage space available in each storage pool 214 associated with the virtual datastore 206 under consideration, based on the configuration data collected for the storage pool 214. As previously described, the configuration data of the storage pools 214 may indicate the available physical storage space.

The available space computation engine 106 may subsequently compare the available physical storage space and the available datastore space to determine the available space metric. In one example, the available space metric is obtained by selecting a value which is lesser between the available physical storage space and the available datastore space. The available space metric may thus indicate the maximum space available for data storage for the virtual machines 204 associated with the virtual datastore 206 under consideration. The available space computation engine 106 may further save the available space metric for the virtual machines 204 in the available space metric 316.

For instance, in the example provided in FIG. 2, the available space metric for the virtual datastore 206-1 may be computed as a value which is lesser between the available physical storage space and the available datastore space. In said example, the available datastore space for the virtual datastore 206-1 may be equal to unutilized storage space from the allocated physical storage of the virtual datastore 206-1.

For instance, in the previous example, if the allocated physical storage of the virtual datastore 206-1 equals 200 GB and 80 GB of the allocated physical storage may have been utilized to store data of the virtual machines 204-1 and 204-2. The available datastore space may be equal to 120 GB. Further, in the previous example, if the physical disk space of each of the storage pools 214-1 and 214-2 equals 100 GB and 60 GB of the physical disk space of each of the storage pools may have been utilized to store data of the virtual datastores 206-1 and 206-2. The storage space available in each of the storage pools may be equal to 40 GB. The available physical storage space may thus be equal to 80 GB. The available space metric for the virtual datastore 206-1 may thus be equal to 80 GB as per the example used in the FIG. 2.

Subsequently, the time-to-threshold computation engine 310 may compute the time value indicating the time left within which the space available for the virtual machines 204 would be utilized. In one example, the time-to-threshold computation engine 310 may compute the time value based on the datastore time-to-threshold metric and the storage pool time-to-threshold metric. The datastore time-to-threshold metric for a virtual datastore may indicate a predicted time by which the available datastore space of the virtual datastore will be completely occupied with data. The storage pool time-to-threshold metric may indicate a predicted time by which the available physical storage space of the storage pools 214, associated with the virtual datastore 206 under consideration, will be completely occupied with data. The time value may be defined, for example, in number of days, seconds, hours, minutes, months, and years.

In one example, the time-to-threshold computation engine 310 may initially compute a storage space consumption rate for the virtual datastore 206 using a projection function and historical storage space consumption data. The historical storage space may be obtained periodically and may indicate volume of storage space consumed by the virtual datastore 206 during the periodic data collection and change in storage space consumption with respect to storage space consumption during a previous periodic data collection. In one example, the historical storage space may be saved in a repository for further processing. Examples of the projection function include, but are not limited to, linear projection function, logarithmic projection function, polynomial projection function, moving average projection function, single exponential smoothing projection function, double exponential smoothing projection function, and triple exponential smoothing projection function.

The time-to-threshold computation engine 310 may then determine the datastore time-to-threshold metric based on the storage space consumption rate and the available datastore space. The time-to-threshold computation engine 310 may further determine the storage pool time-to-threshold metric using the historical storage space consumption data of each of the storage pools 214 associated with the virtual datastore 206, used storage pool space, and the projection function. The time-to-threshold computation engine 310 may subsequently compare the datastore time-to-threshold metric and the storage pool time-to-threshold metric to determine the time value. The time value may indicate maximum time left before complete utilization of the space available for data storage of the virtual machines. In one example, the time value is equal to lesser of the values indicating datastore time-to-threshold metric and the storage pool time-to-threshold metric. Further, time-to-threshold computation engine 310 may save the time value for the virtual machines 204 in the time value 318.

For instance, in the example provided in FIG. 2, and previously discussed with reference to the available space metric for the virtual datastore 206-1, the time value may indicate the time within which either the available datastore space or the available physical storage space is utilized.

Subsequently, the analysis engine 108 may identify a set of competing storage volumes 212 for the virtual datastore 206. In one example, the competing storage volumes 212 are grouped in the storage pools 214 in which the storage volumes 212 associated with the virtual datastore 206 are associated. The competing storage volumes 212, however, are not associated with the virtual datastore under consideration and consume the available physical storage space of the storage pools 214 at a rate higher than the storage volumes 212 associated with the virtual datastore 206. For example, if the storage volume 212-1 and the storage volume 212-2 are grouped into the storage pool 214-1 and the storage volume 212-1 is associated with the virtual datastore 206-1, while the storage volume 212-2 is not associated with the virtual datastore 206-1. The storage volume 212-2 in such a case may be a competing volume if the storage volume 212-2 is consuming the storage space of the storage pool 214-1 at a rate higher than the storage volumes 212-1.

In one example, the analysis engine 108 may initially determine input/output (I/O) activity for each storage volume 212 of the storage pools 214 associated with the virtual datastore 206 under consideration. The I/O activity may indicate the volume of data written to and read from the storage volume 212. The analysis engine 108 may then compare the I/O activity of associated storage volumes 212 with the I/O activity of unassociated storage volumes 212. The associated storage volumes 212 are the storage volumes associated with the virtual datastore 206. The unassociated storage volumes 212 are the storage volumes that are not associated with the virtual datastore 206 but belong to the same storage pool 214 as the associated storage volumes 212. The analysis engine 108 may then determine the unassociated storage volumes 212 having I/O activity greater than the I/O activity of the associated storage volumes 212 as the set of competing volumes.

The analysis engine 108 may subsequently provide at least the over-allocation metric, the available space metric, the time value, and the set of competing volumes to the capacity planning unit 208 for storage space management in the virtual environment 200. In one example, the analysis engine 108 may determine optimized placements of the plurality of virtual machines based on the over-allocation metric, the available space metric, the time value, and the set of competing storage volumes, for storage space management.

Figure 4:
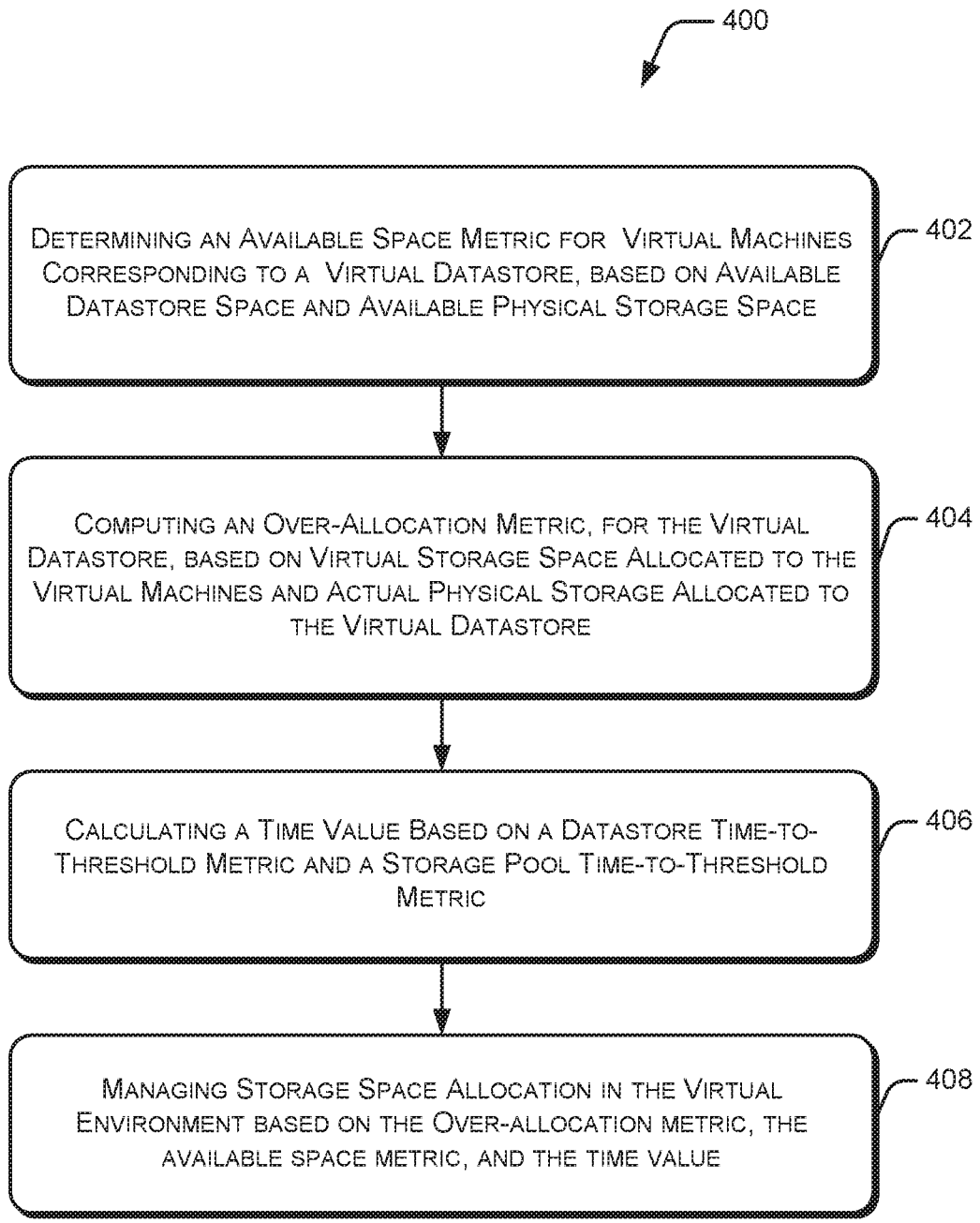
FIG. 4 illustrates a method for storage space management, according to an example of the present subject matter.
Figure 5:
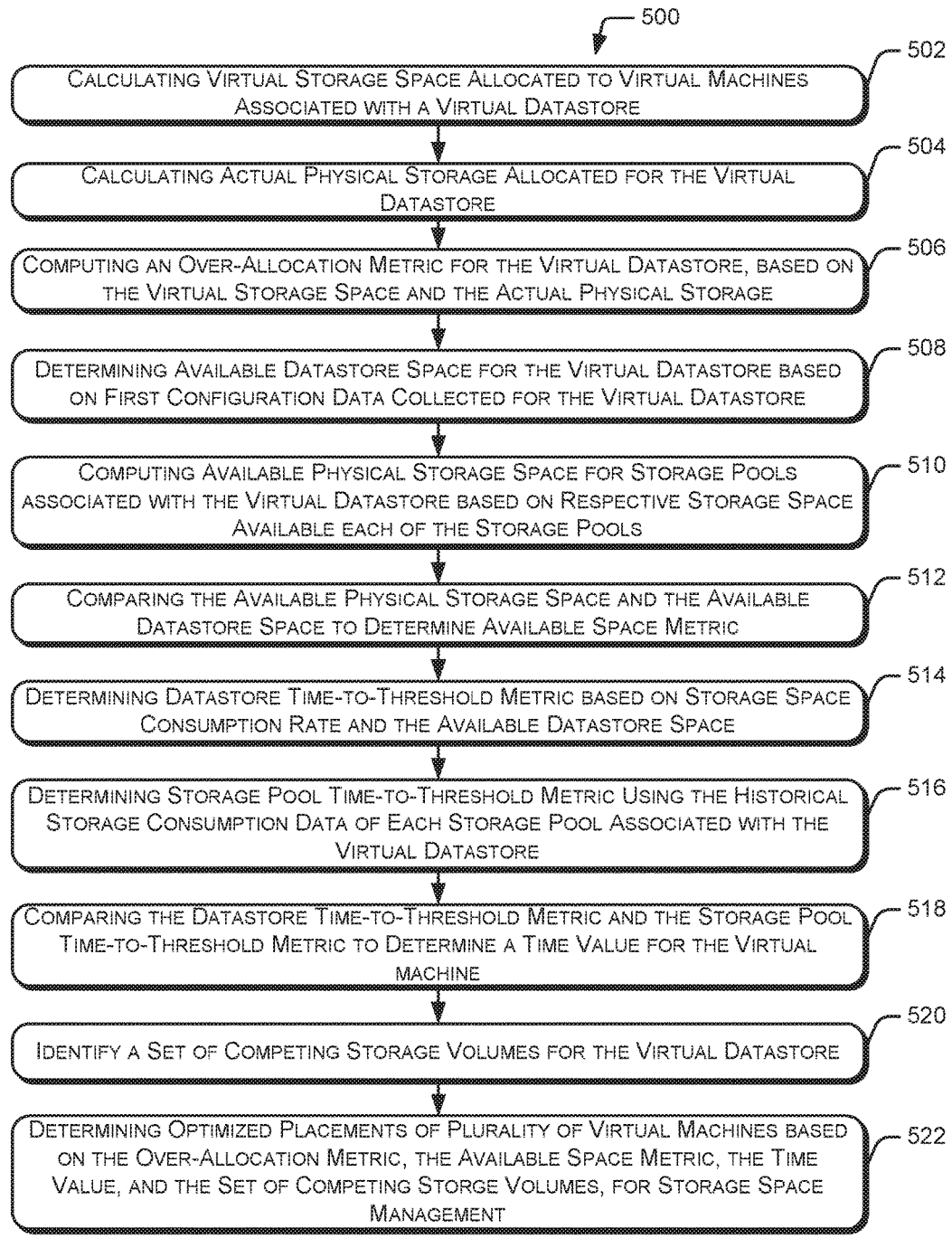
FIG. 5 illustrates a method for storage space management, according to another example of the present subject matter.

FIGS. 4 and 5 illustrate example methods 400 and 500, respectively, for storage space management, in accordance with an example of the present subject matter. The order in which the methods are described is not intended to be construed as a limitation, and any number of the described method blocks may be combined in any order to implement the aforementioned methods, or another method. Furthermore, the methods 400 and 500 may be implemented by processing resource or computing device(s) through any suitable hardware, non-transitory machine readable instructions, or a combination thereof.

The methods 400 and 500 may be performed by computing systems, such as the storage space management system 102. Furthermore, the methods 400 and 500 may be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

Further, the methods 400 and 500 are described below with reference to the storage space management system 102 as described above, other suitable systems for the execution of these methods can be utilized. Additionally, implementation of these methods is not limited to such examples.

Referring to FIG. 4, at block 402, an available space metric may be determined for virtual machines corresponding to a virtual datastore present in a thin provisioned virtual environment. In one example, the available space metric may be determined for the virtual datastore based on available datastore space and available physical storage space. The available space metric may indicate space available for data storage for the virtual machines.

At block 404, an over-allocation metric may be computed for the virtual datastore. In one example, the over-allocation metric may be computed based on virtual storage space allocated to the corresponding virtual machines and actual physical storage allocated to the virtual datastore. The over-allocation metric may indicate the extent of over-allocation of the actual physical storage to the virtual datastore.

At block 406, a time value may be calculated indicating time left before utilization of storage space available for the virtual machines. In one example, the time value may be calculated based on a datastore time-to-threshold metric and storage pool time-to-threshold metric.

At block 408, storage space allocation in the virtual environment may be managed. In one example, the storage allocation may be managed based on the over-allocation metric, the available space metric, and the time value.

Referring to FIG. 5, at block 502, virtual storage space allocated to virtual machines associated with a virtual datastore may be calculated. In one example, the virtual storage space may be determined by a storage space management system, such as the storage space management system 102 based on a datastore provisioning scheme and storage size of each of the virtual machines. In one example, the datastore provisioning scheme may indicate whether the virtual datastore is thin provisioned or thick provisioned. Further, the datastore provisioning scheme may be determined based on topology data corresponding to the virtual datastore. In one example, the virtual storage space allocated to virtual machines associated with the virtual datastore may be equal to sum of storage size of each of the virtual machines.

At block 504, actual physical storage allocated for the virtual datastore may be calculated. In one example, the actual physical storage may be determined by the storage space management system, such as the storage space management system 102 based on a volume provisioning scheme and the physical storage space of each of the storage volumes may be identified to be associated with the virtual datastore. In one example, the volume provisioning scheme indicates whether the storage volume is thin provisioned or thick provisioned.

Further, the volume provisioning scheme may be determined based on topology data corresponding to the storage pool to which the storage volume belongs. In one example, the actual physical storage may be equal to a sum of the physical storage space of each of the storage volumes.

At block 506, an over-allocation metric may be computed for the virtual datastore. In one example, the over-allocation metric may be computed based on the virtual storage space allocated to the corresponding virtual machines and the actual physical storage allocated to the virtual datastore. The over-allocation metric may indicate extent of over-allocation of the actual physical storage to the virtual datastore. In one example, the over-allocation metric may be computed by the storage space management system, such as the storage space management system 102.

At block 508, available datastore space for the virtual datastore may be determined. In one example, the available datastore space may be determined based on first configuration data collected for the virtual datastore. The available datastore space for a virtual datastore may indicate the free or unutilized storage space available with the virtual datastore. In one example, the available datastore space may be computed by the storage space management system, such as the storage space management system 102.

At block 510, available physical storage space may be computed for storage pools associated with the virtual datastore. The available physical storage space may indicate the total free or unutilized physical storage space that may be actually available in the storage pools associated with the virtual datastore. In one example, the available physical storage space may be computed based on the storage space available in the storage pools and may be equal to the sum of storage space available in each storage pool associated with the virtual datastore. The storage space available in each storage pool associated with the virtual datastore may be determined based on configuration data collected for the storage pool. In one example, the available physical storage space may be computed by the storage space management system, such as the storage space management system 102.

At block 512, the available physical storage space may be compared with the available datastore space to determine an available space metric. In one example, the available space metric indicates space available for data storage for the virtual machines. The available space metric may be equal to a value that is lesser between the available physical storage space and the available datastore space. In one example, the available space metric may be computed by the storage space management system, such as the storage space management system 102.

At block 514, datastore time-to-threshold metric may be determined for the virtual datastore. In one example, the storage space management system, such as the storage space management system 102 may compute the datastore time-to-threshold metric based on storage space consumption rate and available datastore space corresponding to the virtual datastore. The datastore time-to-threshold metric indicates a predicted time by which the virtual datastore space will be completely occupied with data. Further, the storage space consumption rate for the virtual datastore may be computed using a projection function and historical storage space consumption data.

At block 516, storage pool time-to-threshold metric may be determined for the storage pools associated with the virtual datastore. In one example, the storage space management system, such as the storage space management system 102 may compute the storage pool time-to-threshold metric using the historical storage space consumption data of each storage pool associated with the virtual datastore, used storage pool space, and the projection function. The storage pool time-to-threshold metric indicates a predicted time by which the available physical storage space may be completely occupied with data.

At block 518, the datastore time-to-threshold metric may be compared with the storage pool time-to-threshold metric to determine a time value for the virtual machines. The time value may indicate time left before complete utilization of the storage space available for the virtual machines. In one example, the storage space management system, such as the storage space management system 102 may compare the datastore time-to-threshold metric and the storage pool time-to-threshold metric to determine the time value. Further, the time value may be equal to lesser of values indicating the datastore time-to-threshold metric and the storage pool time-to-threshold metric.

At block 520, a set of competing storage volumes may be identified for the virtual datastore. Initially, input/output (I/O) activity may be determined for the storage volumes associated with the virtual datastore. Subsequently, I/O activity may be determined for each storage volume not associated with the virtual datastore but present in the same storage pools as the storage volumes associated with the virtual datastore. The I/O activity for each storage volume associated with the virtual datastore may then be compared with the I/O activity for each storage volume not associated with the virtual datastore to identify the set of competing storage volumes. The competing storage volumes may consume the available physical storage space of the storage pools at a higher rate than the storage volumes associated with the virtual datastore. In one example, the set of competing storage volumes may be computed by the storage space management system, such as the storage space management system 102.

At block 522, optimized placements of the plurality of virtual machines may be determined based on the over-allocation metric, the available space metric, the time value, and the set of competing storage volumes. In one example, the optimized placements of the plurality of virtual machines may be determined by a capacity planning unit, such as the capacity planning unit 208, for storage space management.

Figure 6:
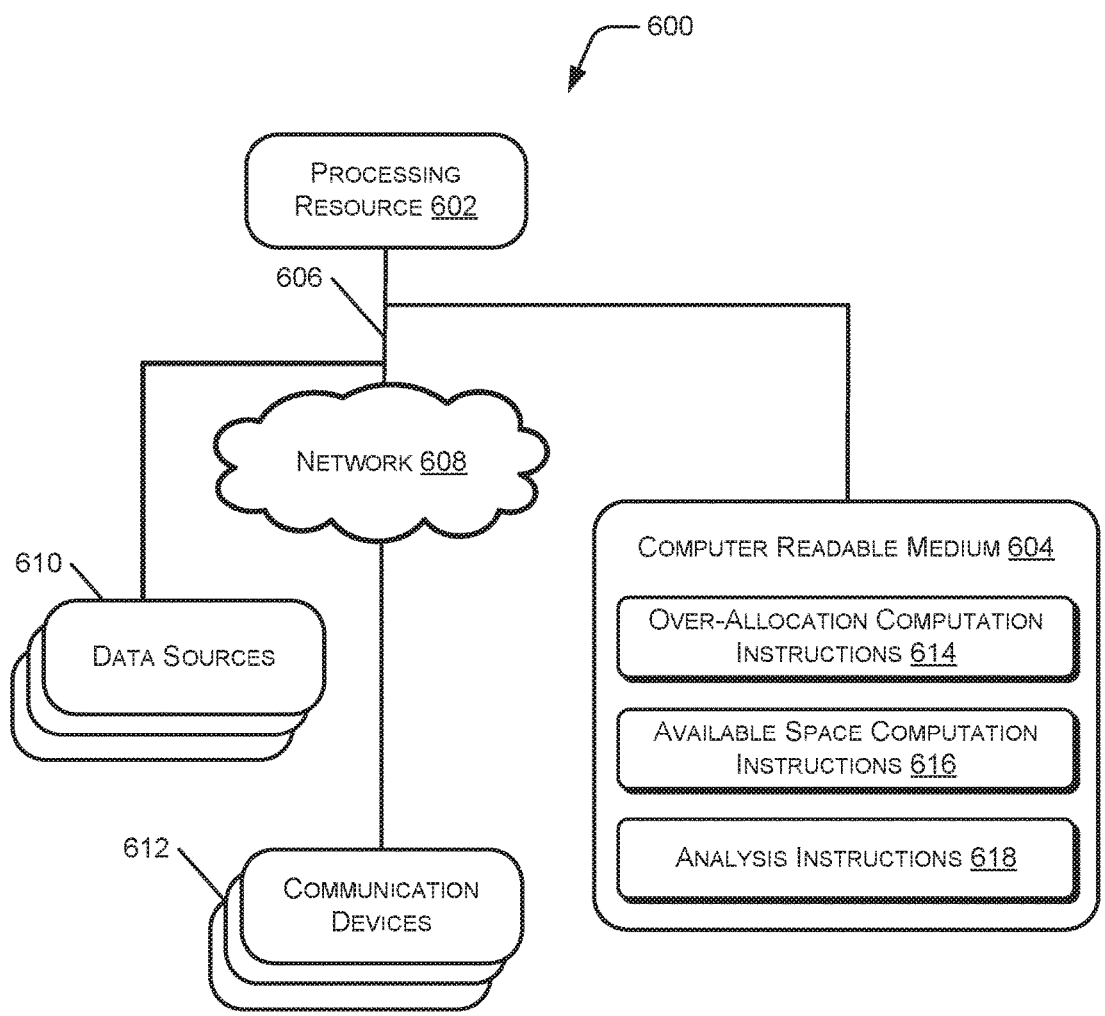
FIG. 6 illustrates a network environment implementing a non-transitory computer readable medium for storage space management, according to an example of the present subject matter.

FIG. 6 illustrates an example network environment implementing a non-transitory computer readable medium for storage space management, according to an example of the present disclosure. The storage space management system environment 600, hereinafter the system environment 600, may comprise at least a portion of a public networking environment or a private networking environment, or a combination thereof. In one implementation, the system environment 600 includes a processing resource 602 communicatively coupled to a computer readable medium 604 through a communication link 606.

For example, the processing resource 602 can include processors of a computing device for storage space management. The computer readable medium 604 can be, for example, an internal memory device of the computing device or an external memory device. In one implementation, the communication link 606 may be a direct communication link, such as any memory read/write interface. In another implementation, the communication link 606 may be an indirect communication link, such as a network interface. In such a case, the processing resource 602 can access the computer readable medium 604 through a network 608. The network 608 may be a single network or a combination of multiple networks and may use a variety of different communication protocols.

The processing resource 602 and the computer readable medium 604 may also be coupled to requested data sources 610 through the communication link 606, and/or to communication devices 612 over the network 608. The coupling with the requested data sources 610 enables in receiving the requested data in an offline environment, and the coupling with the communication devices 612 enables in receiving the requested data in an online environment.

In one implementation, the computer readable medium 604 includes a set of computer readable instructions, implementing over-allocation computation instructions 614, available space computation instructions 616, and analysis instructions 618. The set of computer readable instructions can be accessed by the processing resource 602 through the communication link 606 and subsequently executed to process requested data communicated with the requested data sources 610 in order to facilitate storage space management in a thin provisioned virtual environment. When executed by the processing resource 602, the over-allocation computation instructions 614 may cause the processing resource 602 to perform the functionalities described above in relation to the over-allocation computation engine 104. When executed by the processing resource 602, the available space computation instructions 616 may cause the processing resource 602 to perform the functionalities described above in relation to the available space computation engine 106. When executed by the processing resource 602, the analysis instructions 618 may cause the processing resource 602 to perform the functionalities described above in relation to the analysis engine 108.

For example, available space computation instructions 616, may cause the processing resource 602 to determine, for a virtual datastore implemented in a thin provisioned virtual environment, an available space metric for the virtual machines associated with the virtual datastore. The available space metric may be determined based on available datastore space and available physical storage space. In one example, the available space metric indicates space available for data storage for the virtual machines. Further, the over-allocation computation instructions 614 may cause the processing resource 602 to compute an over-allocation metric for the virtual datastore. The over-allocation metric may be computed based on virtual storage space allocated to the corresponding virtual machines and actual physical storage allocated to the virtual datastore. In one example, the over-allocation metric indicates extent of over-allocation of the actual physical storage to the virtual datastore. Further, the analysis instructions 618 may cause the processing resource 602 to obtain a time value indicating time left within which storage space available for the virtual machine to read or write data would be completely utilized.

Subsequently, the analysis instructions 618 may cause the processing resource 602 to identify a set of competing storage volumes, from among storage volumes of storage pools associated with the virtual datastore. The set of competing storage volumes may be identified based on Input/output (I/O) activity of each storage volume. The competing storage volumes are not associated with the virtual datastore. In one example, the competing storage volumes consume the available physical storage space of the storage pools at a rate higher than storage volumes associated with the virtual datastore. The analysis instructions 618 may subsequently cause the processing resource 602 to provide the available space metric, the over-allocation metric, and the set of competing storage volumes for storage space management in the virtual environment.

Although examples for the present subject matter have been described in language specific to structural features and/or methods, it should be understood that the appended claims are not necessarily limited to the specific features or methods described. Rather, the specific features and methods are disclosed and explained as examples of the present subject matter.

We claim:

1. A storage space management system for a thin provisioned virtual environment having a plurality of virtual datastores associated with multiple virtual machines, the storage space management system comprising:
   an over-allocation computation engine to:
      compute an over-allocation metric, for a virtual datastore, based on virtual storage space allocated to corresponding virtual machines and actual physical storage allocated to the virtual datastore, the over-allocation metric indicating extent of over-allocation of the actual physical storage to the virtual datastore;
   an available space computation engine to:
      determine an available space metric for the virtual machines associated with the virtual datastore based on available datastore space and available physical storage space, with the available space metric indicating space available for data storage for the virtual machines; an analysis engine to:
      obtain a time value indicating time left within which storage space available for the virtual machines would be utilized; and
      provide at least the over-allocation metric, the available space metric, and the time value;
   a time-to-threshold computation engine to:
      compute storage space consumption rate for the virtual datastore using a projection function and historical storage space consumption data;
      determine a datastore time-to-threshold metric based on the storage space consumption rate and the available datastore space, wherein the datastore time-to-threshold metric indicates a first predicted time by which the available datastore space will be occupied with data;
      determine a storage pool time-to-threshold metric using the historical storage space consumption data of each storage pool associated with the virtual datastore, used storage pool space, and the projection function, wherein the storage pool time-to-threshold metric indicates a second predicted time by which the available physical storage space will be completely occupied with data; and
      compare the datastore time-to-threshold metric and the storage pool time-to-threshold metric to determine the time value as a lesser of values indicating the datastore time-to-threshold metric and the storage pool time-to-threshold metric; and
   a capacity planning unit to manage storage space allocation in the virtual environment based on the over-allocation metric, the available space metric, and the time value provided by the analysis engine.

2. The storage space management system as claimed in claim 1, wherein the over-allocation computation engine further is to:
   for each virtual datastore, determine a datastore provisioning scheme indicating whether the virtual datastore is thin provisioned or thick provisioned;
   calculate the virtual storage space allocated to the virtual machines associated with the virtual datastore based on the datastore provisioning scheme and storage size of each of the virtual machines;
   identify storage volumes associated with the virtual datastore;
   for each of the identified storage volumes, determine a volume provisioning scheme for the identified storage volume indicating whether the storage volume is thin provisioned or thick provisioned; and
   calculate the actual physical storage allocated for the virtual datastore based on the volume provisioning scheme and physical storage space of the each of the identified storage volumes.

3. The storage space management system as claimed in claim 1, wherein the available space computation engine further is to:
   determine the available datastore space based on first configuration data collected for the virtual datastore;
   determine storage space available in the each storage pool associated with the virtual datastore based on second configuration data collected for the each storage pool;
   determine the available physical storage space based on respective storage space available in the each storage pool associated with the virtual datastore; and
   compare the available physical storage space and the available datastore space to determine the available space metric, wherein the available space metric is equal to a value that is lesser between the available physical storage space and the available datastore space.

4. The storage space management system as claimed in claim 1, wherein the analysis engine further is to:
   determine input/output (I/O) activity for each storage volume of storage pools associated with the virtual datastore; and
   identify a set of competing storage volumes for the virtual datastore based on the I/O activity for the each storage volume, wherein the competing storage volumes are associated with virtual datastores other than the virtual datastore under consideration, and wherein the competing storage volumes consume the available physical storage space of the storage pools at a rate higher than the storage volumes associated with the virtual datastore.

5. A method for storage space management in a thin provisioned virtual environment having a plurality of virtual datastores associated with multiple virtual machines, the method comprising:
   determining an available space metric for virtual machines corresponding to a virtual datastore, based on available datastore space and available physical storage space, the available space metric indicating space available for data storage for the virtual machines;
   computing an over-allocation metric, for the virtual datastore, based on virtual storage space allocated to the corresponding virtual machines and actual physical storage allocated to the virtual datastore, the over-allocation metric indicating extent of over-allocation of the actual physical storage to the virtual datastore;
   calculating a time value, which indicates time left before utilization of storage space available for the virtual machines, by:
      computing storage space consumption rate for the virtual datastore using a projection function and historical storage space consumption data;
      determining a datastore time-to-threshold metric based on the storage space consumption rate and the available datastore space, wherein the datastore time-to-threshold metric indicates a first predicted time by which the available datastore space will be occupied with data;
      determining a storage pool time-to-threshold metric using the historical storage space consumption data of each storage pool associated with the virtual datastore, used storage pool space, and the projection function, wherein the storage pool time-to-threshold metric indicates a second predicted time by which the available physical storage space will be completely occupied with data; and
      comparing the datastore time-to-threshold metric and the storage pool time-to-threshold metric to determine the time value as a lesser of values indicating the datastore time-to-threshold metric and the storage pool time-to-threshold metric; and
   managing storage space allocation in the virtual environment based on the over-allocation metric, the available space metric, and the time value.

6. The method as claimed in claim 5, wherein the computing an over-allocation metric comprising:
   for each virtual datastore, determining a datastore provisioning scheme indicating whether the virtual datastore is thin provisioned or thick provisioned;
   calculating the virtual storage space allocated to the virtual machines associated with the virtual datastore based on the datastore provisioning scheme and storage size of each of the virtual machines;
   identifying storage volumes associated with the virtual datastore;
   for each of the identified storage volumes, determining a volume provisioning scheme for the identified storage volume indicating whether the storage volume is thin provisioned or thick provisioned; and
   calculating the actual physical storage allocated for the virtual datastore based on the volume provisioning scheme and physical storage space of the each of the identified storage volumes.

7. The method as claimed in claim 5, wherein the determining further comprising:
   determining the available datastore space based on first configuration data collected for the virtual datastore;
   determining storage space available in the each storage pool associated with the virtual datastore based on second configuration data collected for the each storage pool;
   computing the available physical storage space based on the respective storage space available in the each of the storage pools storage pool; and
   comparing the available physical storage space and the available datastore space to determine the available space metric, wherein the available space metric is equal to a value that is lesser between the available physical storage space and the available datastore space.

8. The method as claimed in claim 5, wherein the method further comprising:
   determining, for the each storage pool associated with the virtual datastore, input/output (I/O) activity for storage volumes associated with the virtual datastore;
   determining, for the each storage pool, I/O activity for each storage volume not associated with the virtual datastore;
   identifying a set of competing storage volumes for the datastore based on the I/O activity for storage volumes associated with the virtual datastore and the I/O activity for the each storage volume not associated with the virtual datastore, wherein the competing storage volumes consume the available physical storage space of storage pools at a rate higher than the storage volumes associated with the virtual datastore.

9. The method as claimed in claim 8, wherein the method further comprising:
   determining optimized placements of the virtual machines based on the over-allocation metric, the available space metric, the time value, and the set of competing storage volumes, for storage space management.

10. A non-transitory computer readable medium having a set of computer readable instructions that, when executed, cause a processor to:
   determine an available space metric for virtual machines associated with a virtual datastore implemented in a thin provisioned virtual environment, based on available datastore space and available physical storage space, the available space metric indicating space available for data storage for the virtual machines;
   compute an over-allocation metric, for the virtual datastore, based on virtual storage space allocated to the corresponding virtual machines and actual physical storage allocated to the virtual datastore, the over-allocation metric indicating extent of over-allocation of the actual physical storage to the virtual datastore;
   compute storage space consumption rate for the virtual datastore using a projection function and historical storage space consumption data;
   determine a datastore time-to-threshold metric based on the storage space consumption rate and the available datastore space, wherein the datastore time-to-threshold metric indicates a first predicted time by which the available datastore space will be completely occupied with data;
   determine a storage pool time-to-threshold metric using the historical storage space consumption data of each storage pool, used storage pool space, and the projection function, wherein the storage pool time-to-threshold metric indicates a second predicted time by which the available physical storage space will be completely occupied with data;

compare the datastore time-to-threshold metric and the storage pool time-to-threshold metric to determine a time value indicating time left before utilization of the storage space available for the virtual machines, wherein the time value is a lesser of values indicating the datastore time-to-threshold metric and the storage pool time-to-threshold metric;

provide the available space metric, the over-allocation metric, and the time value; and manage storage space allocation in the virtual environment based on the over-allocation metric, the available space metric, and the time value.

11. The non-transitory computer readable medium of claim 10, wherein the computer readable instructions, when executed, further cause the processor to:

for each virtual datastore, determine a datastore provisioning scheme indicating whether the virtual datastore is thin provisioned or thick provisioned;

calculate the virtual storage space allocated to the virtual machines associated with the virtual datastore based on the datastore provisioning scheme and storage size of each of the virtual machines;

determine a volume provisioning scheme for the storage volumes associated with the virtual datastore, indicating whether the storage volume is thin provisioned or thick provisioned; and calculate the actual physical storage allocated for the virtual datastore based on the volume provisioning scheme and the physical storage space of each of the storage volumes.

12. The non-transitory computer readable medium of claim 10, wherein the computer readable instructions, when executed, further cause the processor to:

determine the available datastore space based on first configuration data collected for the virtual datastore;

determine storage space available in storage pools associated with the virtual datastore based on second configuration data collected for the storage pool;

compute the available physical storage space based on the storage space available in the storage pools; and compare the available physical storage space and the available datastore space to determine the available space metric, wherein the available space metric is equal to a value that is lesser between the available physical storage space and the available datastore space.

13. The non-transitory computer readable medium of claim 10, wherein the computer readable instructions, when executed, further cause the processor to:

determine, for the each storage pool associated with the virtual datastore, input/output (I/O) activity for storage volumes associated with the virtual datastore;

determine, for the each storage pool, I/O activity for each storage volume not associated with the virtual datastore; and identify a set of competing storage volumes for the datastore based on the I/O activity for storage volumes associated with the virtual datastore and the I/O activity for the each storage volume not associated with the virtual datastore, wherein the competing storage volumes consume the available physical storage space of the storage pools at a rate higher than the storage volumes associated with the virtual datastore.

* * * * *